(12) United States Patent
Bane et al.

(10) Patent No.: US 12,523,730 B2
(45) Date of Patent: Jan. 13, 2026

(54) LOW-PROFILE ANGLE OF ARRIVAL ANTENNAS

(71) Applicant: Cisco Technology, Inc., San Jose, CA (US)

(72) Inventors: Danielle N. Bane, Cleveland, OH (US); Jonathan M. Cyphert, Richfield, OH (US); Sivadeep R. Kalavakuru, Akron, OH (US); Ashish Pasha Sheikh, Akron, OH (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/481,825

(22) Filed: Oct. 5, 2023

(65) Prior Publication Data

US 2024/0027561 A1 Jan. 25, 2024

Related U.S. Application Data

(62) Division of application No. 16/871,967, filed on May 11, 2020, now Pat. No. 11,835,636.

(51) Int. Cl.
*G01S 3/04* (2006.01)
*G01S 3/48* (2006.01)
(Continued)

(52) U.S. Cl.
CPC .......... *G01S 3/043* (2013.01); *H01Q 5/307* (2015.01); *H01Q 7/00* (2013.01); *H01Q 9/30* (2013.01); *H01Q 21/20* (2013.01); *G01S 3/48* (2013.01)

(58) Field of Classification Search
CPC .......... G01S 3/043; H01Q 5/307; H01Q 7/00; H01Q 9/30; H01Q 21/20
See application file for complete search history.

(56) References Cited

U.S. PATENT DOCUMENTS 10,305,174 B2  5/2019  Ryan et al.
2011/0102281 A1*  5/2011  Su .................. H01Q 21/205
                                              343/742

(Continued)

FOREIGN PATENT DOCUMENTS

CN  106664265 A  5/2017
CN  107534213 A  1/2018

(Continued)

OTHER PUBLICATIONS

Office Action for Chinese Application No. 202180034787.1, dated May 31, 2024, 19 Pages.

(Continued)

*Primary Examiner* — Dieu Hein T Duong
(74) *Attorney, Agent, or Firm* — Patterson + Sheridan, LLP

(57) ABSTRACT

The present disclosure provides a dual mode antenna, comprising: a first conductive piece; and a second conductive piece, configured to electromagnetically couple with the first conductive piece through a dielectric at a second frequency to operate as a loop antenna with the first conductive piece and configured to operate independently of the first conductive piece at a first frequency to operate as a monopole antenna. The dual mode antenna can be included in an antenna array as one of a plurality of dual mode antennas coupled to a routing substrate or a reference dual mode antenna coupled to the routing substrate along with a plurality of single mode antennas coupled to the routing substrate; wherein each antenna of the plurality of dual mode antennas, the reference dual mode antenna, and the plurality of single mode antennas is arranged evenly relative to a first neighboring antenna and a second neighboring antenna.

12 Claims, 14 Drawing Sheets

(51) Int. Cl.
*H01Q 5/307* (2015.01)
*H01Q 7/00* (2006.01)
*H01Q 9/30* (2006.01)
*H01Q 21/20* (2006.01)

(56) References Cited

U.S. PATENT DOCUMENTS

2017/0324153 A1* 11/2017 McGough .............. H01Q 1/246
2018/0294551 A1* 10/2018 Ryan ...................... H01Q 21/24

FOREIGN PATENT DOCUMENTS

CN 107768842 A * 3/2018 ........... H01Q 1/2258
CN 110999107 A 4/2020

OTHER PUBLICATIONS

Office Action for Chinese Application No. 202180034787.1, dated Oct. 30, 2024, 17 Pages.

* cited by examiner

LOW-PROFILE ANGLE OF ARRIVAL ANTENNAS

CROSS-REFERENCE TO RELATED APPLICATIONS

This application is a divisional of U.S. patent application Ser. No. 16/871,967 filed May 11, 2020. The aforementioned related patent application is herein incorporated by reference in its entirety.

TECHNICAL FIELD

Embodiments presented in this disclosure generally relate to antennas. More specifically, embodiments disclosed herein relate to antennas usable in arrays for determining an angle of arrival with one or more other instances of those antennas.

BACKGROUND mom Several wireless communications standards use Angle of Arrival (AoA) calculations to determine what direction a signal is received from, which can be used to identify the location of a mobile station (STA) relative to an Access Point (AP) serving, or potentially serving, that STA. To determine the AoA of a signal, an operator can use an array of antennas with known distances therebetween to measure a phase difference of arrival of a single signal to several individual antennas of the array of antennas. By knowing the relative angle of a STA to an AP, the operator can improve the signaling between the STA and the AP and make various other location-dependent determinations in the signaling environment (including beam steering, providing location-specific services, assisting in handoffs between APs, etc.).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
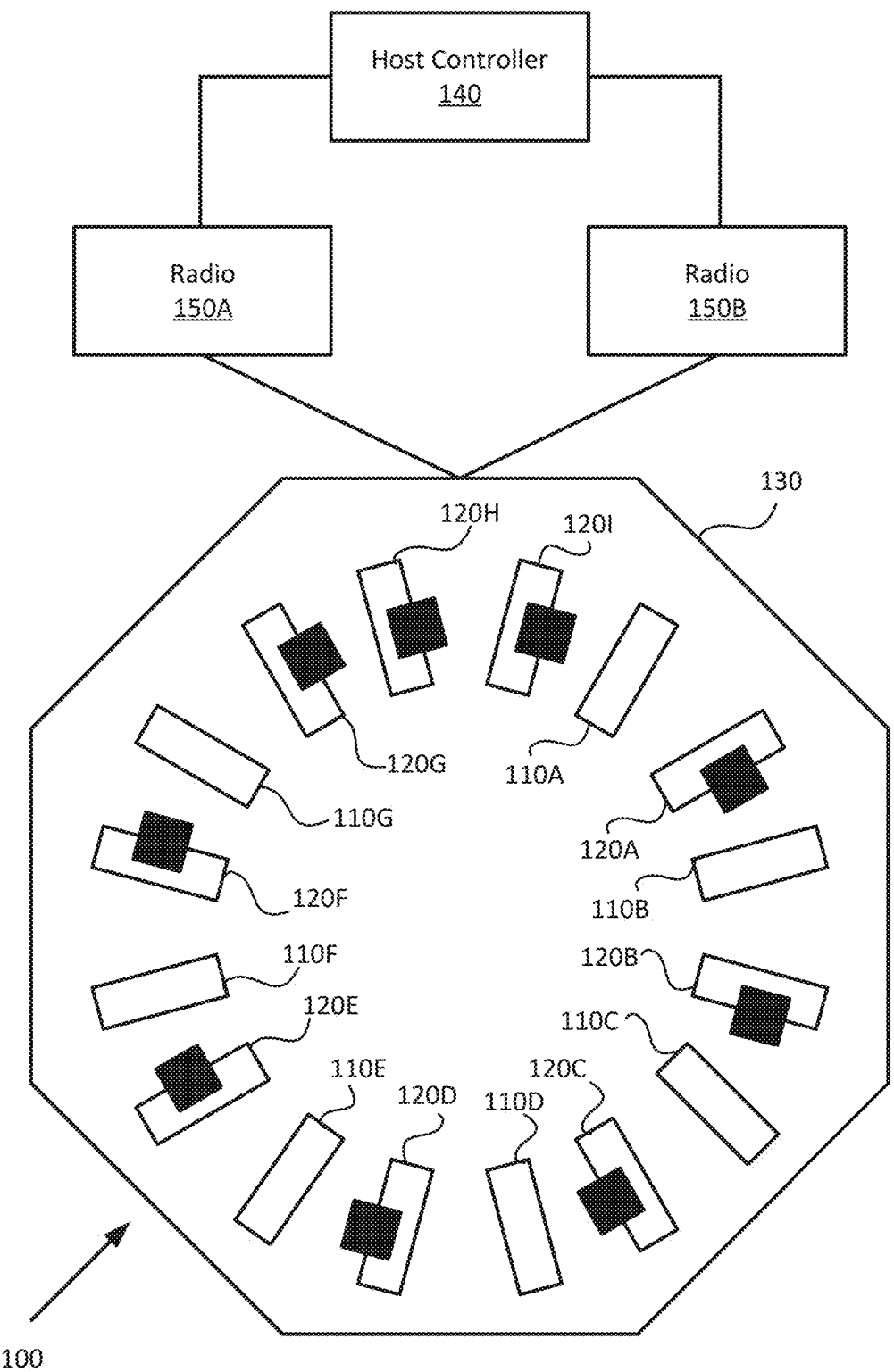
FIGS. 1A-1D illustrate an antenna array, according to embodiments of the present disclosure

One embodiment presented in this disclosure provides for a dual mode antenna, comprising: a first conductive piece; and a second conductive piece, configured to electromagnetically couple with the first conductive piece through a dielectric at a second frequency to operate as a loop antenna with the first conductive piece and configured to operate independently of the first conductive piece at a first frequency to operate as a monopole antenna.

One embodiment presented in this disclosure provides for an antenna array, comprising: a routing substrate; a plurality of dual mode antennas coupled to the routing substrate; a reference dual mode antenna coupled to the routing substrate; a plurality of single mode antennas coupled to the routing substrate; wherein each antenna of the plurality of dual mode antennas, the reference dual mode antennas, and the plurality of single mode antennas is arranged evenly relative to a first neighboring antenna and a second neighboring antenna.

One embodiment presented in this disclosure provides for a system, comprising: a processor; a memory storage device including instructions that when executed by the processor perform an operation comprising: identifying a first radio of a first RAT type to receive signals from an antenna array during a first time period and a second radio of a second RAT type that is different than the first RAT type to receive signals from the antenna array during a second time period that is non-contemporaneous with the first time period, wherein the antenna array includes a plurality of dual mode antennas and a plurality of single mode antennas; switching, during the first time period, outputs from the antenna array to the first radio, wherein the plurality of dual mode antennas are operated as monopole antennas and the plurality of single mode antennas are operated as loop antennas; calculating a first AoA for signals of the first RAT type received during the first time period; switching, during the second time period, outputs from the antenna array to the second radio, wherein the plurality of dual mode antennas are operated as loop antennas; and calculating a second AoA for signals of the second RAT type received during the second time period.

Example Embodiments

Free space within an AP is at a premium, and end users consistently desire slimmer and smaller APs for installation in signaling environments (e.g., to be less obtrusive or to fit into tighter spaces). The present disclosure provides for a low-profile AoA antenna array using dual mode and single mode antennas and a switching architecture to allow for (non-contemporaneous) use of the antenna array for communications standards using two different frequencies. The low-profile AoA antenna array allows for a more efficient use of space by using bent-metal antennas (rather than planar antennas), and a plurality of dual mode antennas associated with a plurality of single mode antennas so that a single, smaller antenna array can be used for an AP providing services via multiple communications standards and/or frequency bands. When used by a first radio at a first frequency, the single mode antennas and the dual mode antennas (operating in a first mode as monopole antennas) are used to determine an AoA. In contrast, when used by a second radio at a second frequency, the single mode antennas are not used, but the dual mode antennas are used (operating in a second mode as loop antennas) to determine the AoA.

Although several non-limiting examples are given in the present disclosure that explain concepts using particular values for frequencies, wavelengths, and distances, it shall be understood that these values are approximate, and that a fabricator can build in tolerances to allow for slight differences in signal waveforms, component sizing, component placement, etc. Accordingly, the present disclosure can be used with frequencies, wavelengths, and distances other than those discussed herein, and any value provided herein shall be understood to include values ±10% of the stated value, which can account for rounding and/or fabrication tolerances.

FIGS. 1A-1D illustrate an antenna array 100, according to embodiments of the present disclosure. The antenna array 100 includes a routing substrate 130 to which several different individual antennas are attached and routed, via a host controller 140, to at least a first radio 150A and a second radio 150B (generally or collectively, radio 150). As illustrated, the several individual antennas include a plurality of single mode antennas 110A-G (generally or collectively, single mode antenna 110) and a plurality of dual mode antennas 120A-I (generally or collectively, dual mode antenna 120), which each of the radios 150 can use differently (based on the operating frequency of the given radio 150) to determine an AoA for a STA.

The antenna array 100 provides for the shared usage of a set of antennas by different radios 150. The radios 150 can be two instances of the same type of Radio Access Technology (RAT) signaling device that operate at different frequencies, or can be two different RAT signaling devices that operate at the same or different frequencies. In a further embodiment, one of the radios 150 can operate at two frequencies and the other radio 150 operates at one of the two frequencies. For example, the first radio 150A can be a WiFi radio or signaling device that operates at a 5 GHz (Gigahertz) frequency or a 2.4 GHz frequency, and the second radio 150B can be a Bluetooth radio or signaling device at operates at a 2.4 GHz frequency. In another example, the first radio 150A can be a first WiFi signaling device that operates at a 5 GHz frequency and the second radio 150B can be a second WiFi signaling device that operates at a 2.4 GHz frequency.

FIG. 1A illustrates the layout of the individual antennas of the antenna array 100, which can be selectively activated or deactivated based on the frequency and/or RAT type used by the currently active radio 150, according to embodiments of the present disclosure. The single mode antennas 110, which are described in greater detail in regard to FIGS. 6A-6C, are provided as loop antennas to operate at a first frequency (e.g., 5 GHz), and the dual mode antennas 120, which are described in greater detail in regard to FIGS. 2A-C, 3A-3C, 4A-4C, and 5A & 5B, are provided as monopole antennas at the first frequency (e.g., 5 GHz) and as loop antennas at a second frequency (e.g., 2.4 GHz). The antennas are arranged around the routing substrate 130 at known distances and angles from one another to enable the radios 150 to perform AoA arrival calculations based on phase differences for when different antennas receive the same signal from a STA. The single mode antennas and the dual mode antennas are vertically polarized and are generally aligned in planes that are parallel to the plane of the routing substrate 130, thus saving vertical space in the antenna array 110 and more efficiently using available horizontal space.

In one embodiment, the antennas are spaced no more than half a wavelength ($\lambda/2$) from one another, but as the antenna array 100 is configured to operate at two different wavelengths, which antennas are active/operational, and what operational mode those antennas are in (e.g., a loop mode or a monopole mode) can change according to the frequency used by the radio 150 that is currently active or has control of the antenna array 100.

Figure 1B:
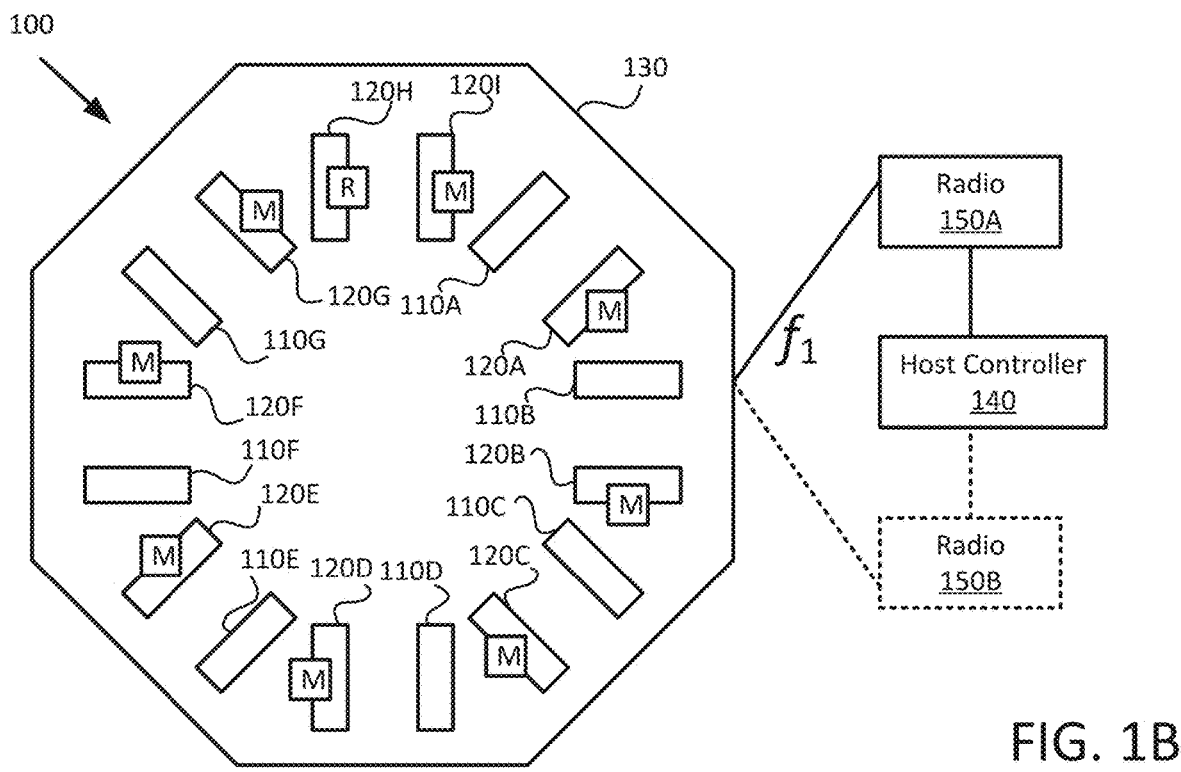

FIG. 1B illustrates a first operational layout for the antenna array 100 operating at a first frequency ($f_1$), according to embodiments of the present disclosure. In the first operational layout, the host controller 140 connects the first radio 150A to the antenna array 100 (and disconnects the second radio 150B). The single mode antennas 110A-110G are all active and operating as loop antennas, and the dual mode antennas 120A-I are also all active, with dual mode antennas 120A-1 operating as monopole (M) antennas and dual mode antenna 120H operating as a reference (R) antenna. For example, when the first radio 150A is operating at a first frequency of 5 GHz, the wavelengths ($\lambda$) used are approximately 60 mm (millimeters), and therefore each of the antennas are located no more than 30 mm ($\lambda/2$) from the neighboring antennas. For example, the first single mode antenna 110A is located 30 mm or less from the ninth dual mode antenna 120I and 30 mm or less from the first dual mode antenna 120A. Similarly, the first dual mode antenna 120A is located 30 mm or less from the first single mode antenna 110A and the second single mode antenna 110B. As will be appreciated, other distances between antennas can be used when other frequencies are selected for use as the first frequency.

Figure 1C:
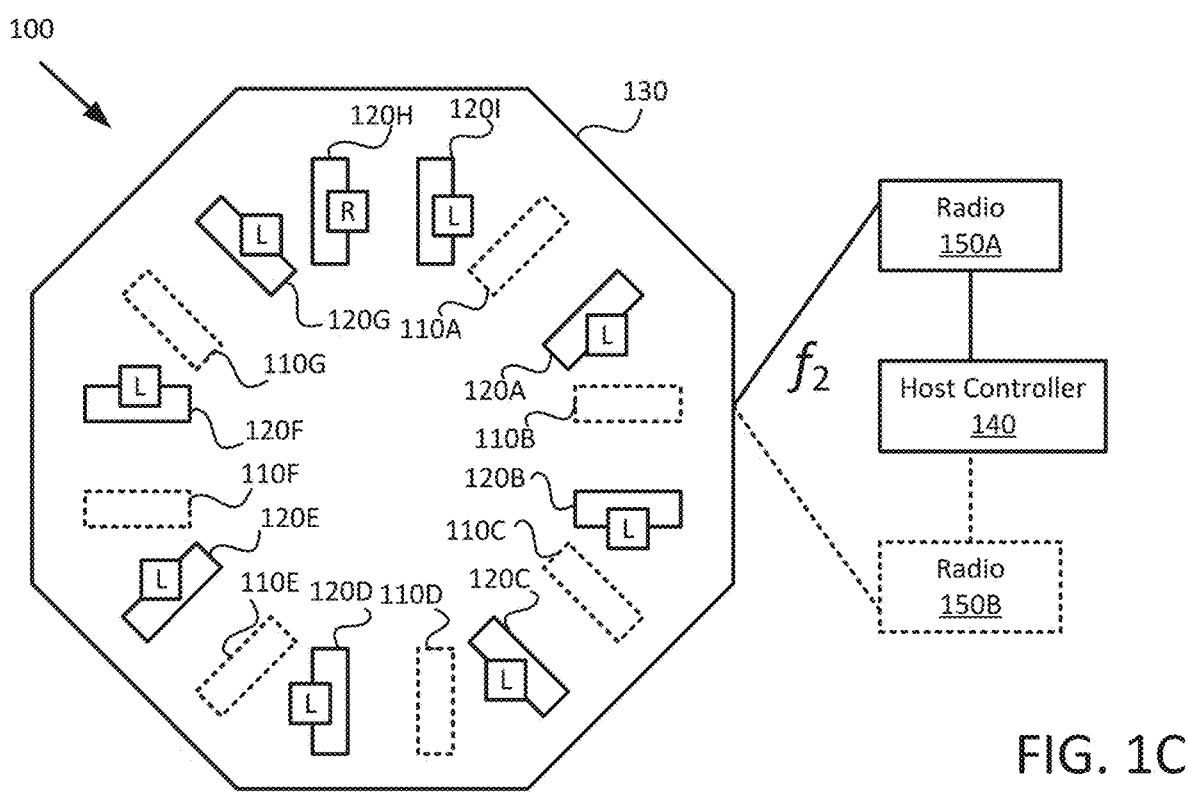

FIG. 1C illustrates a second operational layout for the antenna array 100 operating at a second frequency ($f_2$), according to embodiments of the present disclosure. In the second operational layout, the host controller 140 connects the first radio 150A to the antenna array 100 (and disconnects the second radio 150B). The single mode antennas 110A-110G are all disabled, and the dual mode antennas 120A-1 are all active, with dual mode antennas 120A-I operating as loop (L) antennas and with dual mode antenna 120H operating as a reference antenna. For example, when the first radio 150A is signaling at a first frequency of 2.4 GHz, the wavelengths ($\lambda$) used are approximately 125 mm (millimeters), and therefore each of the active antennas are located no more than 63 mm ($\lambda/2$) from the neighboring active antennas. For example, the first dual mode antenna 120A is located 62.5 mm or less from the ninth dual mode antenna 120I and the second dual mode antenna 120B. Similarly, the second dual mode antenna 120B is located 62.5 mm or less from the first dual mode antenna 120A and the third dual mode antenna 120C. As will be appreciated, other distances between antennas can be used when other frequencies are selected for use as the second frequency.

Figure 1D:
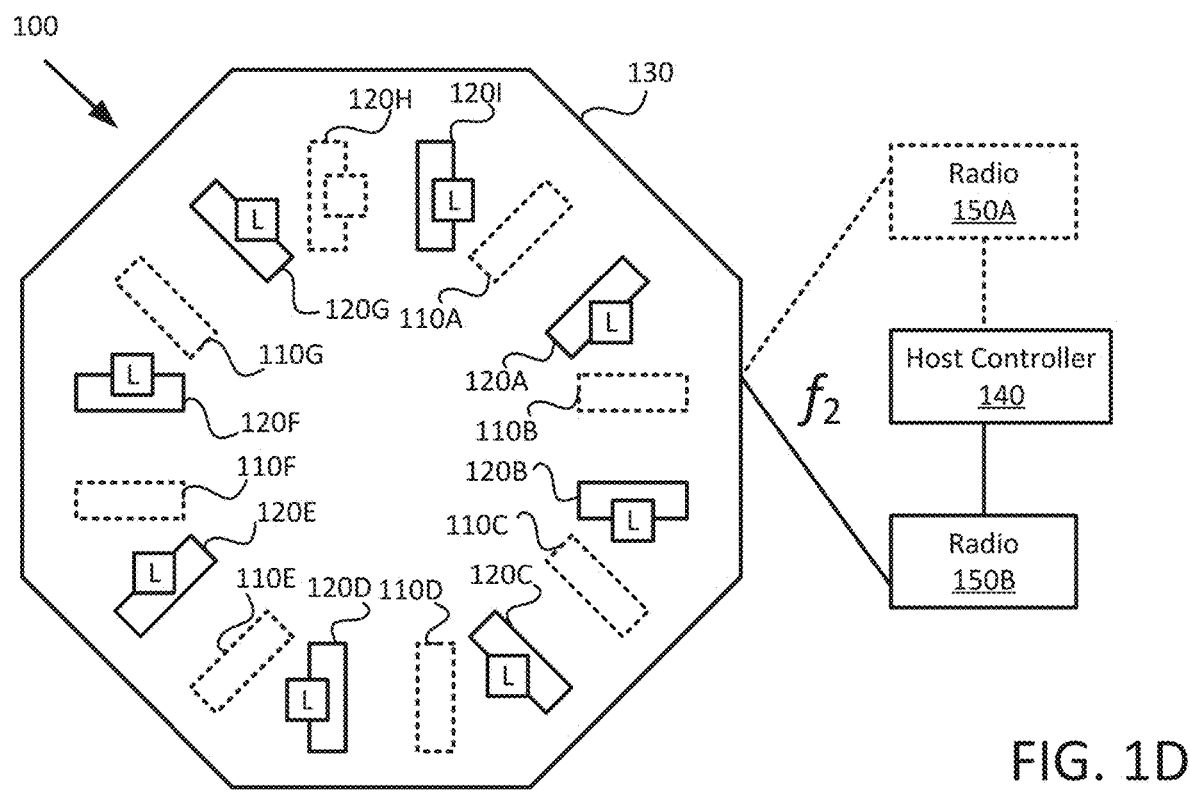

FIG. 1D illustrates a third operational layout for the antenna array 100 operating at a second frequency ($f_2$), according to embodiments of the present disclosure. In the second operational layout, the host controller 140 connects the second radio 150B to the antenna array 100 (and disconnects the first radio 150A). The single mode antennas 110A-110G are inactive (as indicated by the dashed outlines), and the dual mode antennas 120A-G and 120I are active and operating as loop antennas while the dual mode antenna 120H is inactive (as indicated by the dashed outline). For example, when the second radio 150B is signaling at a second frequency of 2.4 GHz, the wavelengths used are approximately 125 mm, and therefore each of the active antennas are located no more than 62.5 mm the neighboring active dual mode antennas 120. For example, the first dual mode antenna 120A is located 62.5 mm or less from the ninth dual mode antenna 120I and the second dual mode antenna 120B. Similarly, the second dual mode antenna 120B is located 62.5 mm or less from the first dual mode antenna 120A and the third dual mode antenna 120C. As will be appreciated, other distances between antennas can be used when other frequencies are selected for use as the second frequency.

To enable the antenna array 100 to operate at two different frequencies, the antennas are arranged in a pattern so that the half-wavelength spacing is respected for each set of active antennas (e.g., all of the antennas when signaling according to the first wavelength and the indicated dual mode antennas when signaling according to the second wavelength). The pattern can be understood as an alternating set of antennas, rotated about a central point of the routing substrate 130 with a dual mode antenna 120 occupying every odd position in the pattern (e.g., the first, third, fifth, etc., positions) and a single mode antenna 110 occupying every even position in the pattern (e.g., the second, fourth, sixth, etc., positions) but for one. One even position in the pattern (e.g., the zeroth or sixteenth positon) is occupied by a dual mode antenna 120 set for use as a reference antenna in the first and second operational layouts. In an alternative explanation, when using sixteen antennas, there are seven identical pairs of one single mode antenna 110 and one dual mode antenna 120 (e.g., the first single mode antenna 110A and the first dual mode antenna 120B) and one pair of two dual mode antennas (e.g., the eight dual mode antenna 120H and the ninth dual mode antenna 120I), where the dual mode antenna 120 is positioned where the single mode antenna 110 would have been positioned in the other seven pairs is designated as the reference antenna. As will be appreciated, the pattern or sets of pairs understanding both describe the antenna array 100 described herein and can be applied in various embodiments to use more than or fewer than sixteen individual antennas as required by the radios 150.

In a further explanation, each antenna can be understood to have two neighboring antennas, which are the closest antennas to a given antenna. A first neighbor antenna can be understood to be the closest antenna clockwise to a given antenna, and a second neighbor antenna can be understood be the closeted antenna counterclockwise to the given antenna. The antennas are spaced evenly relative to one another (accounting for manufacturing tolerances) so that space between the neighboring antennas is consistent regardless which antenna is identified as the given antenna. For example, the first single mode antenna 110A has the first dual mode antenna 120A as a first neighbor antenna, and the ninth dual mode antenna 120I as a second neighbor antenna. Similarly, the fifth dual mode antenna 120E has the sixth single mode antenna 110F as a first neighbor antenna, and the fifth single mode antenna 110E as a first neighbor antenna. As evenly spaced neighboring antennas, the spaces between the first single mode antenna 110A and the first dual mode antenna 120A, the first single mode antenna 110A and the ninth dual mode antenna 120I, the fifth dual mode antenna 120E and the sixth single mode antenna 110F, and the fifth dual mode antenna 120E are all substantially equal. Similarly, the spacing between any given antenna and the neighboring antennas thereof is substantially equal.

In various embodiments, the routing substrate 130 includes an electrical integrated circuit or a printed circuit board in which various traces are defined to route signals to and from various contacts to which the antennas and the host controller 140 are connected. Although illustrated as generally octagonal, in various embodiments the routing substrate 130 can take various shapes to better fit within the housing of an AP along with the other chips, substrates, modules, the host controller 140, and/or the radios 150.

In various embodiments, the host controller 140 is computing device or a microcontroller that provides timing control for which radio 150 is connected to the routing substrate 130 (and the associated antennas) at a given time. The host controller 140 provides each radio 150 with non-contemporaneous access to the routing substrate 130. Stated differently, the host controller 140 controls when one of the connected radios 150 can use the antennas and when the other connected radios 150 are to wait for use of the antennas. In various embodiments, the host controller 140 can provide access based on a repeating time division scheme (e.g., X seconds for the first radio 150A, Y seconds for the second radio 150B, X seconds for the first radio 150A, etc.), based on competing requests of bids from the control devices for the radios 150, or other time division access control schemes.

Figure 2A:
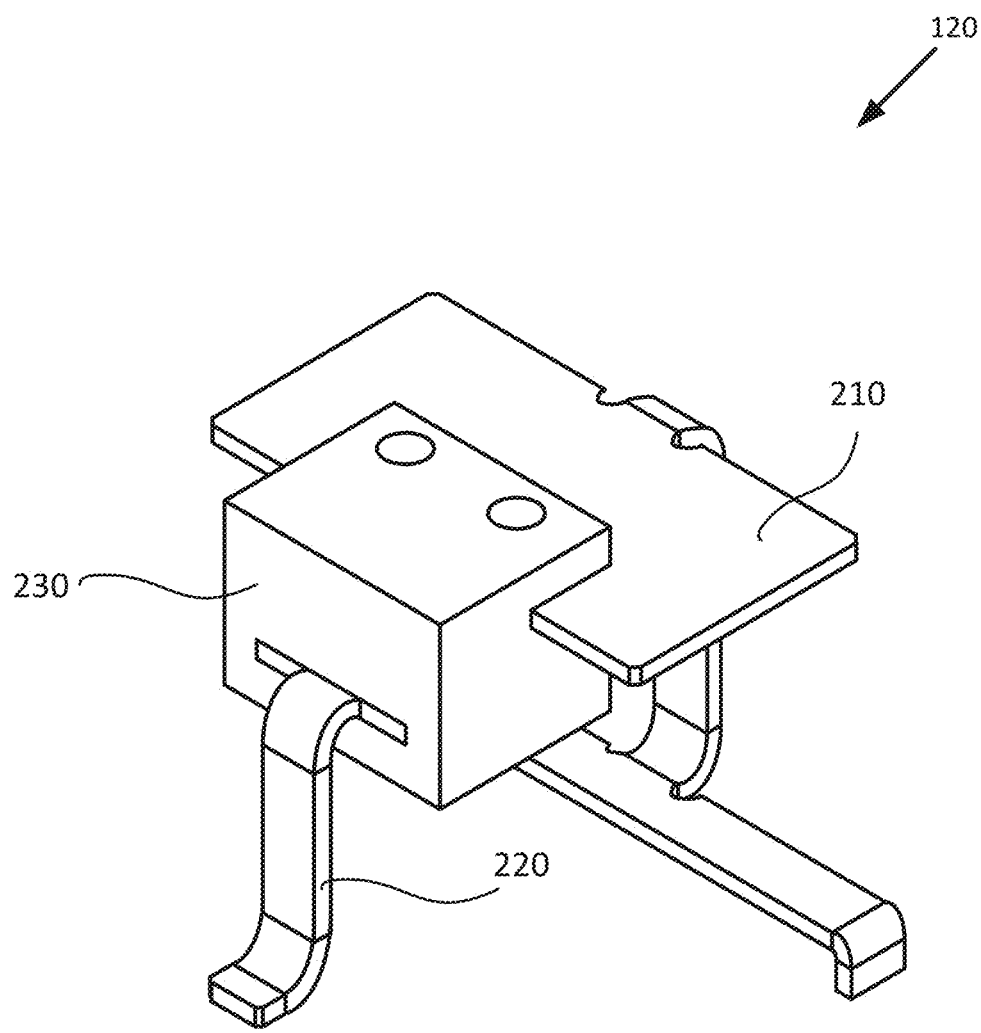
FIGS. 2A-2C illustrate several views of a dual mode antenna, according to embodiments of the present disclosure.
Figure 2A:
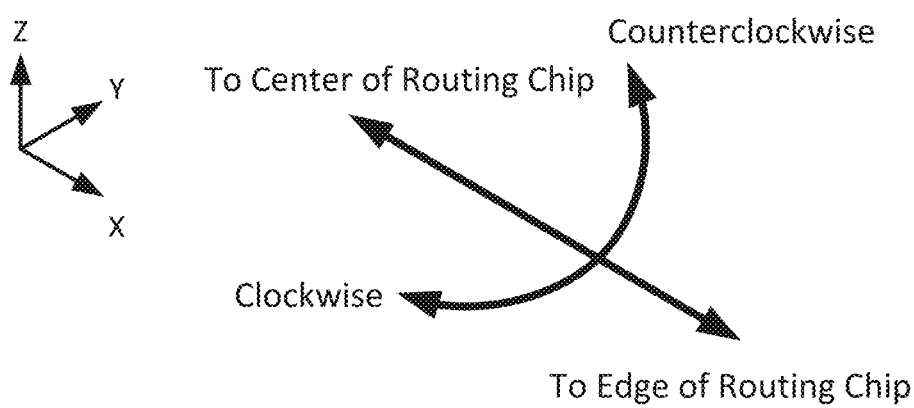
Figure 2B:
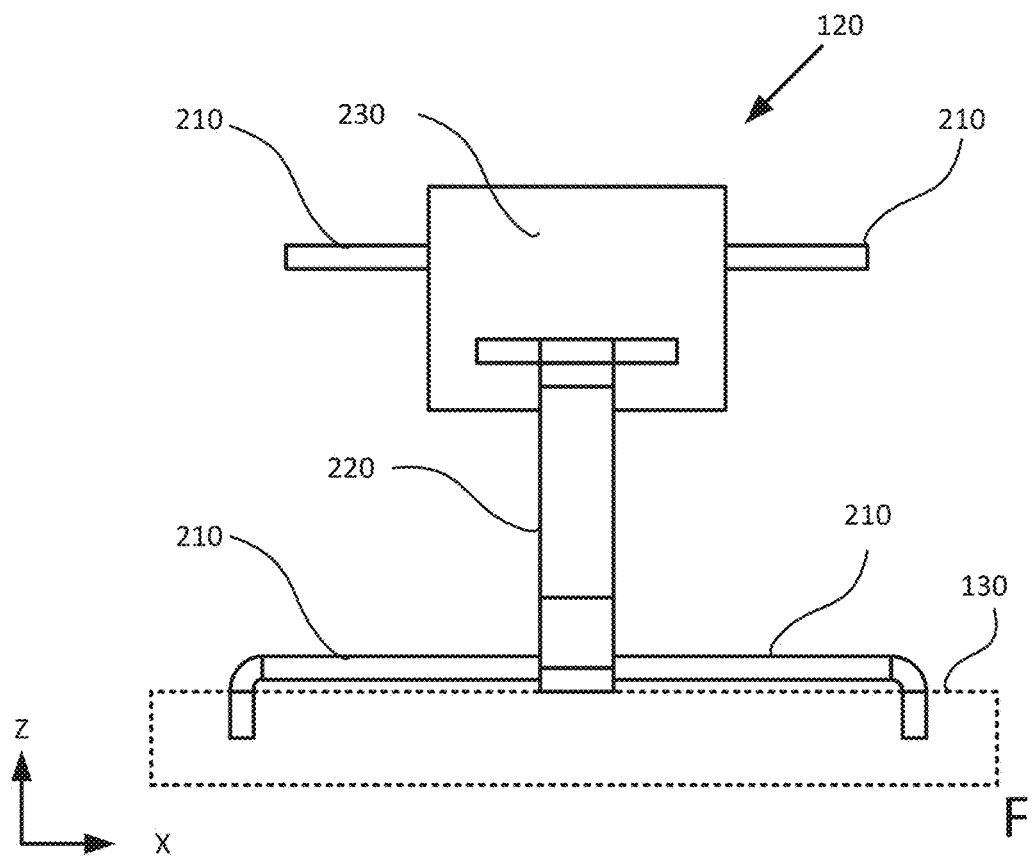
Figure 2C:
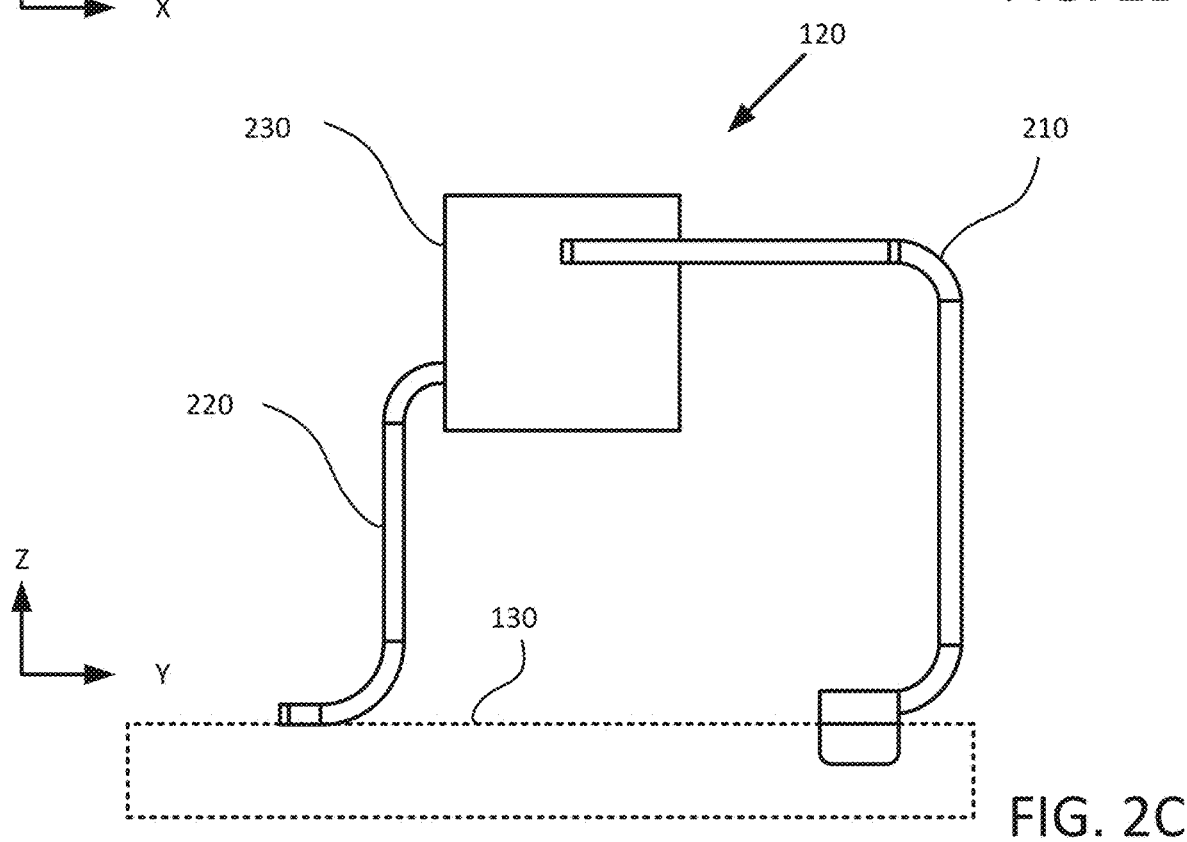

FIGS. 2A-2C illustrate several views of a dual mode antenna 120, according to embodiments of the present disclosure. FIG. 2A provides an isometric view of the dual mode antenna 120, while FIG. 2B provides a facing view in the ZX plane and FIG. 2C provides a facing view in the ZY plane. The dual mode antenna 120 includes a first aerial 210, a second aerial 220, and (optionally) a spacer 230. Each of the aerials 210, 220 are conductive pieces that allow the dual mode antenna 120 to operate in two different modes at two different frequencies. The second aerial 220 (discussed in greater detail in regard to FIGS. 4A-4C) operates at the first frequency as a quarter-wavelength monopole antenna. When operated at the second frequency, the first and second aerials 210, 220 electromagnetically couple with one another to form a loop antenna.

The aerials 210, 220 can be connected to the routing chip 130 via various divots, through-holes, or solder connections between the surface of the routing chip 130 (or a solder pad defined thereon) and a foot of the respective aerial 210, 220. Various vertical members raise the horizontal surfaces to different heights relative to one another. Additionally, the horizontal surfaces extend from the respective vertical members towards one another, but are separated by a horizontal offset. In various embodiments, the spacer 230 (discussed in greater detail in regard to FIGS. 5A and 5B) holds the first aerial 210 and second aerial 220 in position to maintain the vertical and horizontal offsets between the first and second aerials 210, 220 when connecting the dual mode antenna to the routing substrate 130, and/or to provide a dielectric medium through which the horizontal surfaces electromagnetically couple when operated at the second frequency. The vertical offset, horizontal offset, and dielectric constant of the spacer 230 directly affect the electromagnetic coupling between surfaces. As illustrated in FIGS. 2A-2C, a first surface area of the horizontal member of the first aerial 210 is greater than a second surface area of the horizontal member of the second aerial 210, but in other embodiments the surface areas may be substantially equal or the second surface area may be greater than the first surface area.

Each of the dual mode antennas 120 connected to the routing substrate 130 are oriented in the same direction. For example, in FIG. 2A, the second aerial 220 is located clockwise to the first aerial 210 when considering the routing substrate 130 in the XY plane to rotate about the Z axis, and is represented of each of the plurality of dual mode antennas 120. In another example, each of the dual mode antennas 120 could be oriented in the opposite alignment shown in FIG. 2A to have the first aerial 210 located clockwise to the second aerial 220.

Figure 3A:
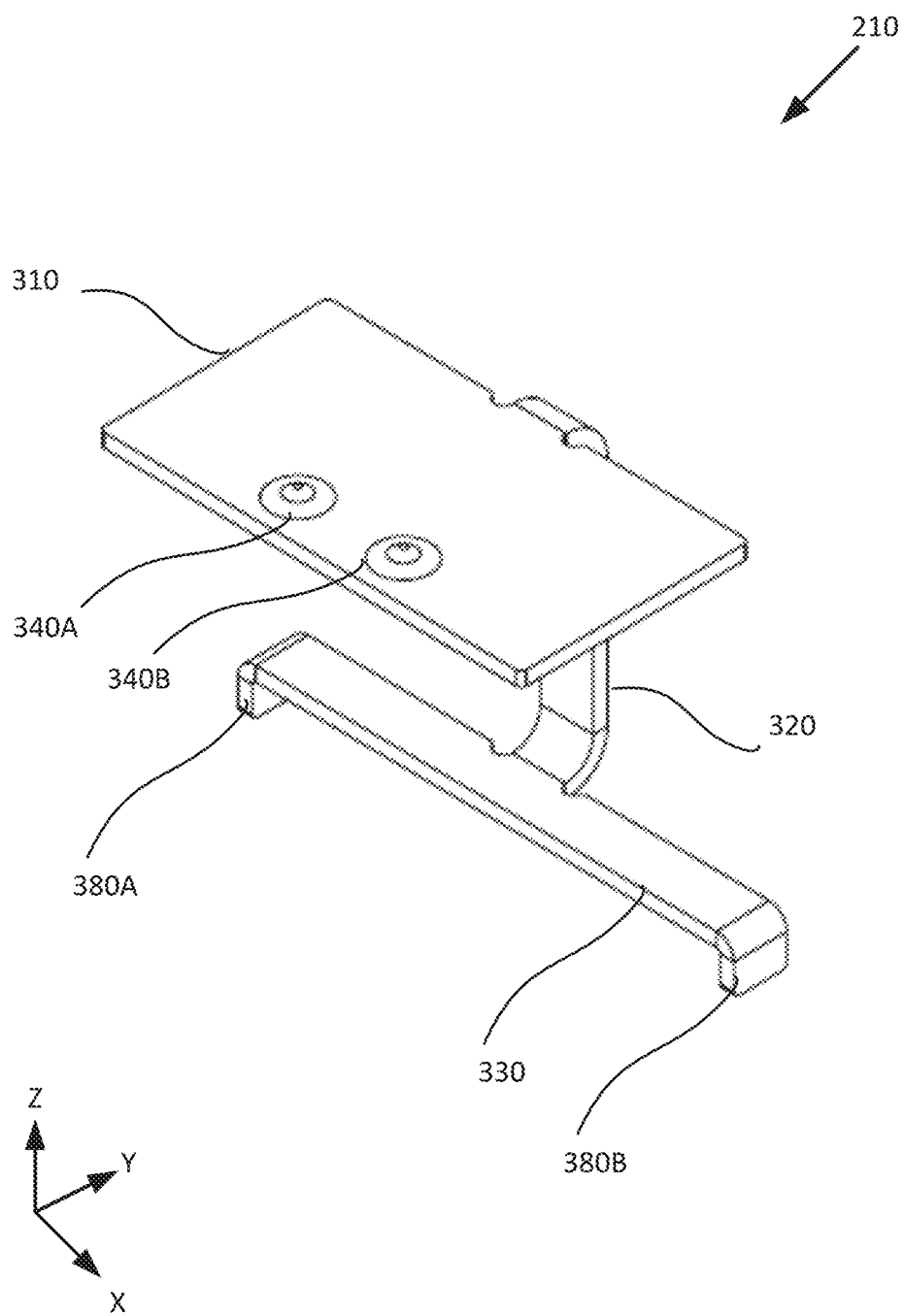
FIGS. 3A-3C illustrate several views of a first aerial of a dual mode antenna, according to embodiments of the present disclosure.
Figure 3B:
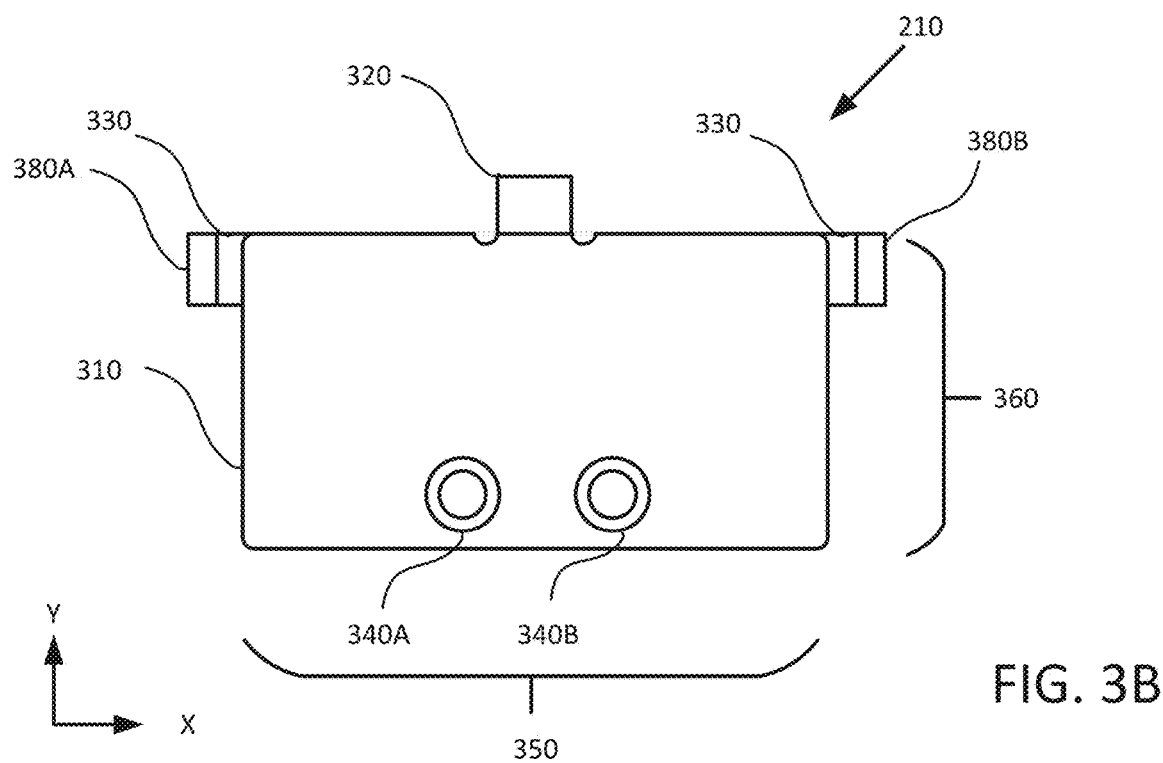
Figure 3C:
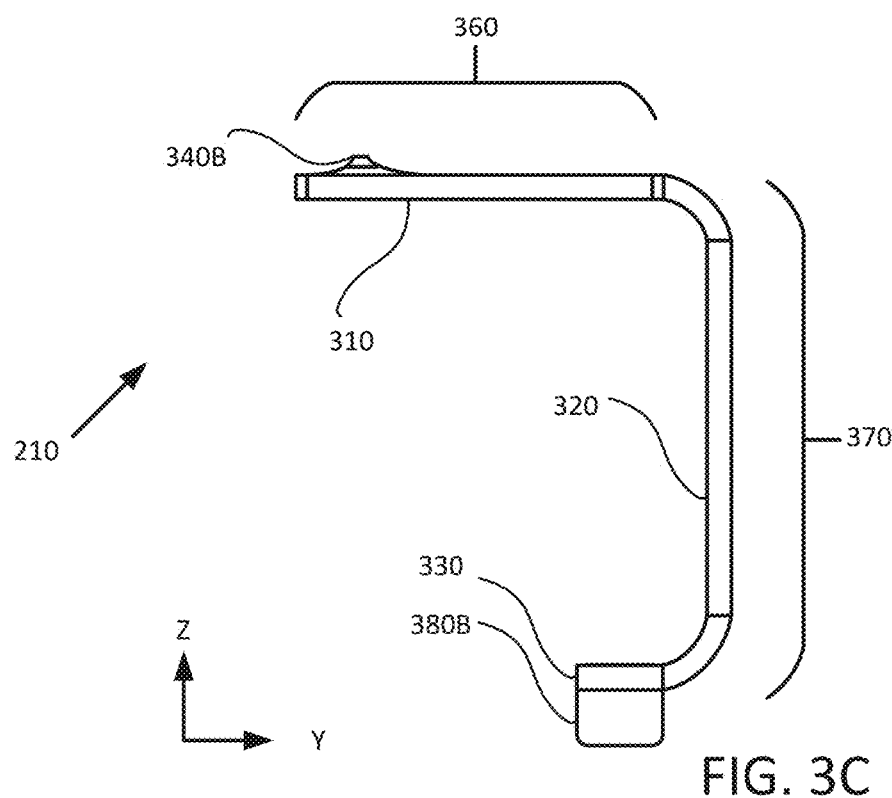

FIGS. 3A-3C illustrate several views of a first aerial 210 of a dual mode antenna 120 as in FIGS. 2A-2C, according to embodiments of the present disclosure. FIG. 3A provides an isometric view of the first aerial 210, while FIG. 3B provides a facing view in the YX plane and FIG. 3C provides a facing view in the ZY plane. The first aerial 210 includes a first horizontal member 310, a first vertical member 320, and a first foot 330 that connects the first aerial 210 to the routing substrate 130 (not illustrated). In various embodiments, the first foot 330 can be longer than, shorter than, or the same length (in the X direction) as the first horizontal member 310, and can optionally include one or more of a first toe 380A and a second toe 380B that are configured to slot into and engage a corresponding depression or through-hole in the routing substrate 130, which can include a contact pad or can provide for physical alignment of the first aerial 210 without including a contact pad therein. In addition to or instead of one or more toes 380A, 380B, the first foot 330 can be mounted (e.g., by a solder joint) to a contact pad defined on the surface of the routing substrate 130. For example, the first foot 330 can be connected to a trace in the routing substrate 130 that is connected to ground.

The first horizontal member 310 has a first length 350 (in the X direction) and a first width 360 (in the Y direction), and the first vertical member has a first height 370 (in the Z direction). The first length 350 and first width 360 are set based on the second frequency to receive signals carried on the second frequency (e.g., 2.4 GHz) as a loop antenna in conjunction with the second aerial 220. The first width 360 of the first horizontal member 310 is also set to position the first aerial 210 with a predefined horizontal offset to the second aerial 220 when the aerials 210, 220 are assembled into a dual mode antenna 120. The first height 370 of the first vertical member 320 is set to raise the first horizontal member 310 above the second aerial 220 when the aerials 210, 220 are assembled into a dual mode antenna 120. Because the toes 380A, 380B (if included) are configured to sit below the surface of the routing substrate 130, the height of the toes 380A, 380B (in the Z direction) is not included in the first height 370 of the first vertical member 320.

As illustrated in FIGS. 3A-3C, the first horizontal member 310 includes a first tooth 340A and a second tooth 340B to engage with a spacer 230 as in FIGS. 2A-2C. The teeth 340A, 340B are configured to engage corresponding divots in a spacer 230 to hold the first aerial 210 to the spacer 230. In various embodiments, the teeth 340A, 340B are formed as dimples (e.g., via a press brake) on one side of the material of the first horizontal member 310 to form a circular (or other shape) of protrusion on the opposite side of the first horizontal member 310. In various embodiments, the first horizontal member 310 can include more than two or fewer than two teeth (including no teeth) at various locations on the first horizontal member 310 based on a complementary design on the spacer 230.

In various embodiments, the first aerial is 210 is formed from a single sheet of conductive material (e.g., metal) of substantially uniform thickness that is bent into a three-dimensional shape in which the first horizontal member 310 is substantially perpendicular to the first vertical member 320. In various embodiments, the first foot 330 may be longer or shorter than is illustrated, may bend inward from the first vertical member 320 to be underneath the first horizontal member 310 (as illustrated) or outward from the first vertical member 320 to not be overlapped by the first horizontal member 310.

Figure 4A:
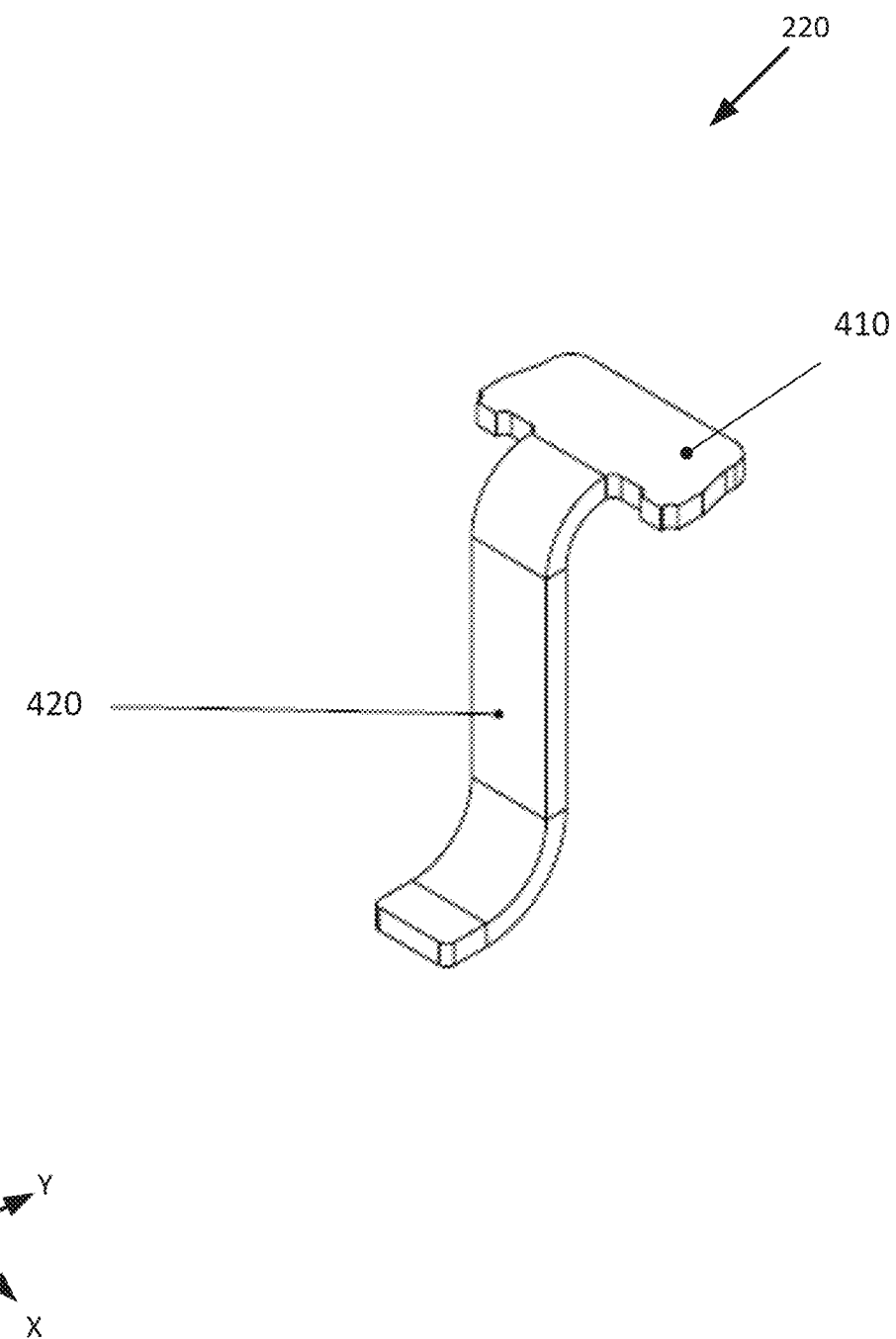
FIGS. 4A-4C illustrate several views of a second aerial of a dual mode antenna, according to embodiments of the present disclosure.
Figure 4B:
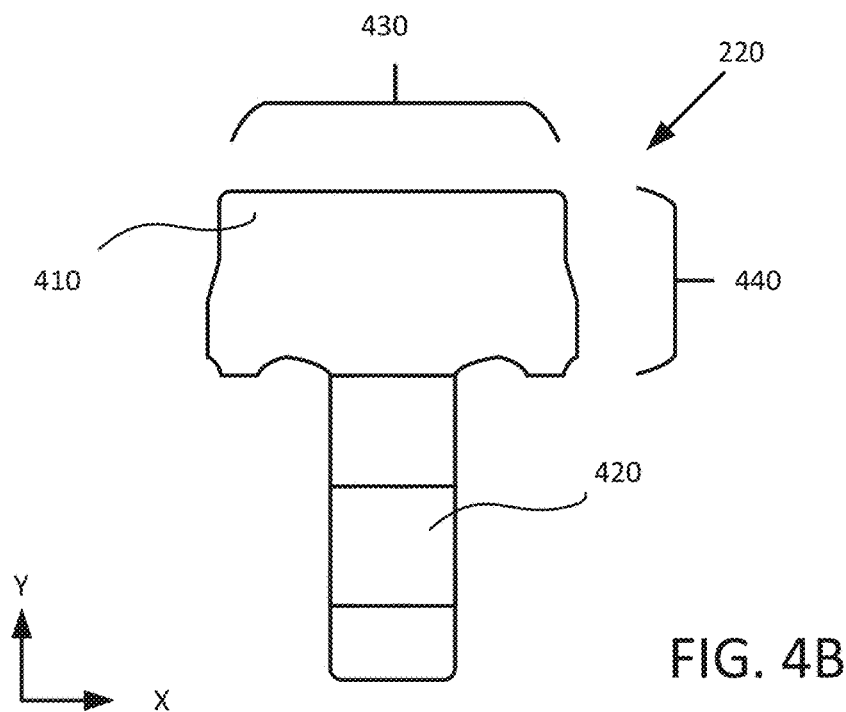
Figure 4C:
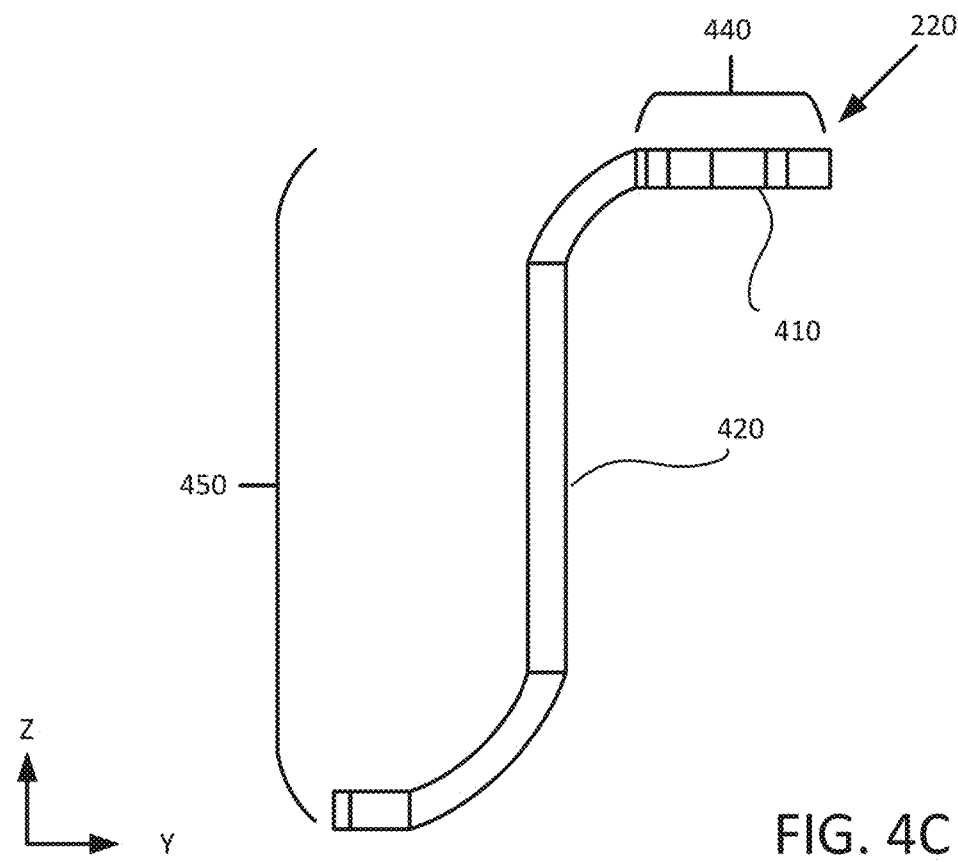

FIGS. 4A-4C illustrate several views of a second aerial 220 of a dual mode antenna 120 as in FIGS. 2A-2C, according to embodiments of the present disclosure. FIG. 4A provides an isometric view of the second aerial 220, while FIG. 4B provides a facing view in the YX plane and FIG. 4C provides a facing view in the ZY plane. The second aerial 220 includes a second horizontal member 410 that electromagnetically couples with the first aerial 210 when operated as a loop antenna, but the second aerial 220 otherwise operates as a monopole antenna. Although not illustrated, in some embodiments, the second vertical member 420 can also include a corresponding toe that is configured to slot into and engage a corresponding depression or through-hole in the routing substrate 130 (not illustrated), which can include a contact pad or can provide for physical alignment of the second aerial 220 without including a contact pad therein. In addition to or instead of one or more toes, the second vertical member 420 can be mounted (e.g., by a solder joint) to a contact pad defined on the surface of the routing substrate 130. For example, the second vertical member 420 can be connected to a trace in the routing substrate 130 that is connected to a signal output.

The second horizontal member 410 has a second length 430 (in the X direction) and a second width 440 (in the Y direction), and the second vertical member 420 has a second height 450 (in the Z direction). The second width 440 of the second horizontal member 410 is set to position the second aerial 220 with a predefined horizontal offset to the first aerial 210 when the aerials 210, 220 are assembled into a dual mode antenna 120. The second height 450 of the second vertical member 420 is set to raise the second horizontal member 410 above routing substrate 130, but below the first horizontal member 310 of the first aerial 210 when the aerials 210, 220 are assembled into a dual mode antenna 120.

In various embodiments, the second aerial is 220 is formed from a single sheet of metal of substantially uniform thickness that is bent into a three-dimensional shape in which the second horizontal member 410 is substantially perpendicular to the second vertical member 420.

Figure 5A:
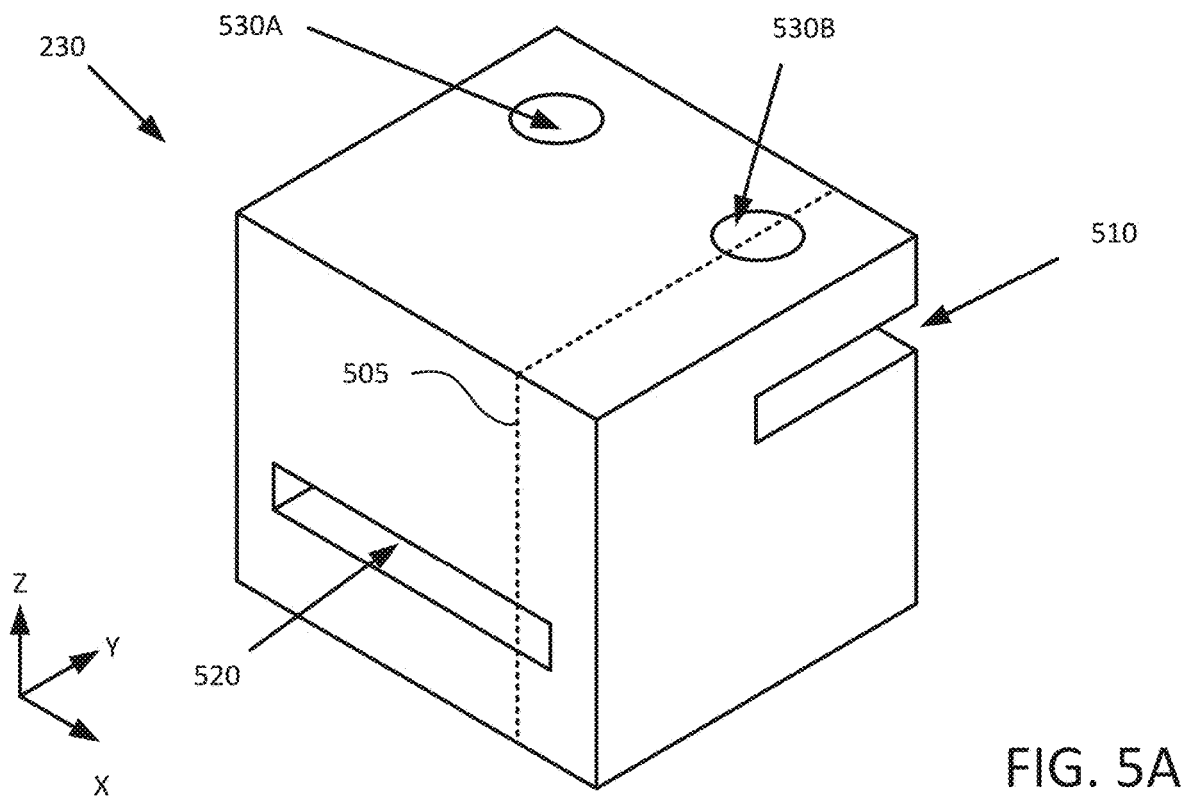
FIGS. 5A and 5B illustrate several views of a spacer of a dual mode antenna, according to embodiments of the present disclosure.
Figure 5B:
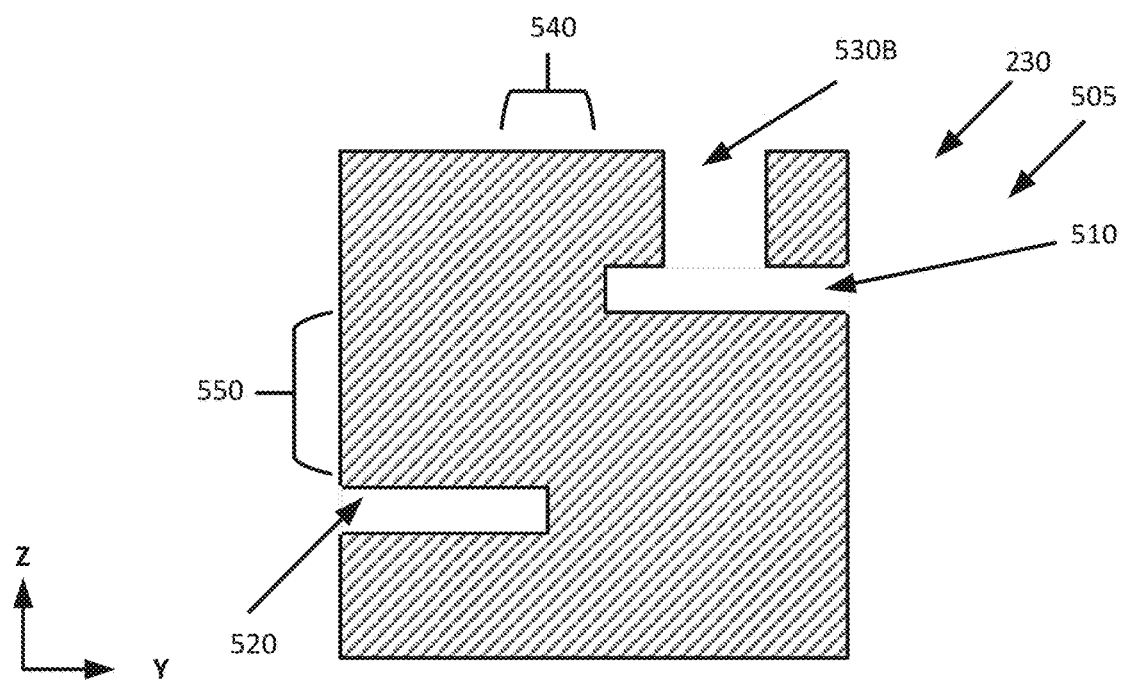
Figure 6A:
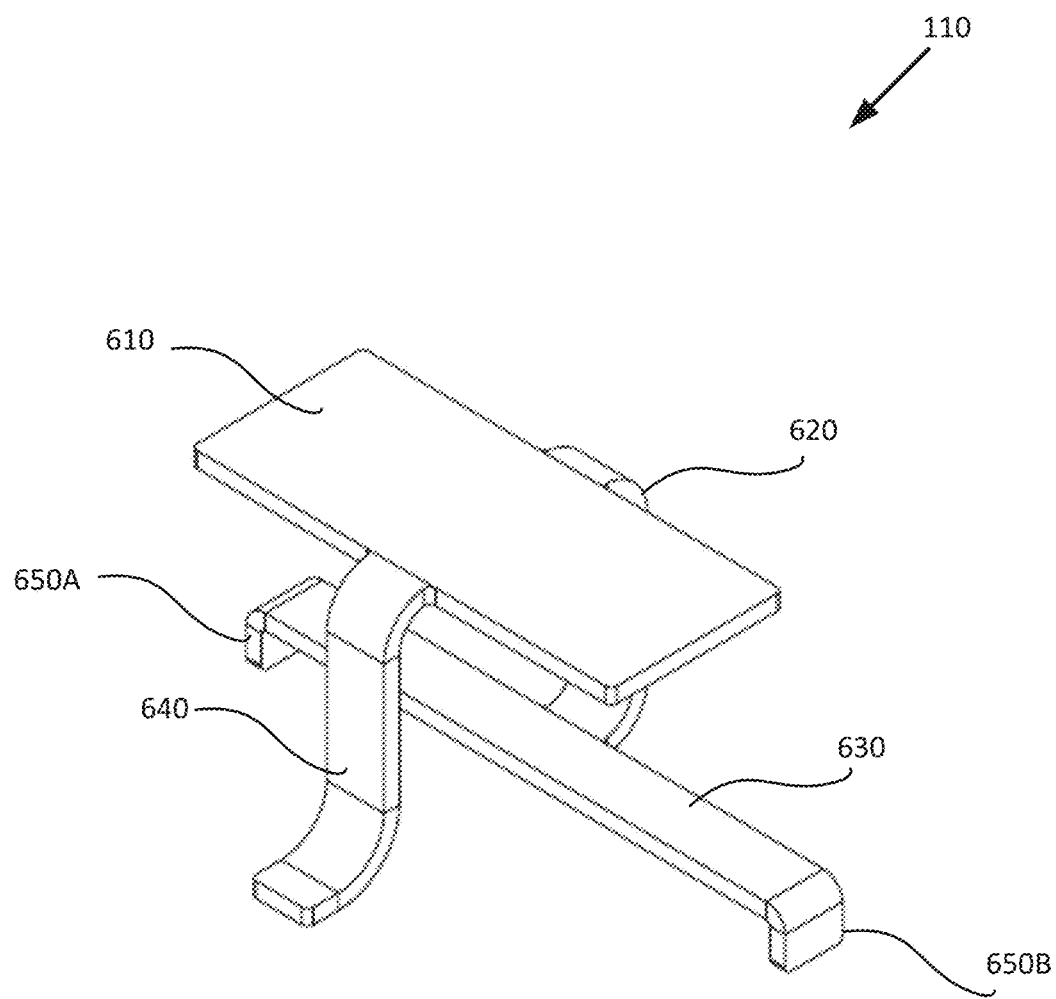
FIGS. 6A-6C illustrate several views of a single mode antenna, according to embodiments of the present disclosure.
Figure 6A:
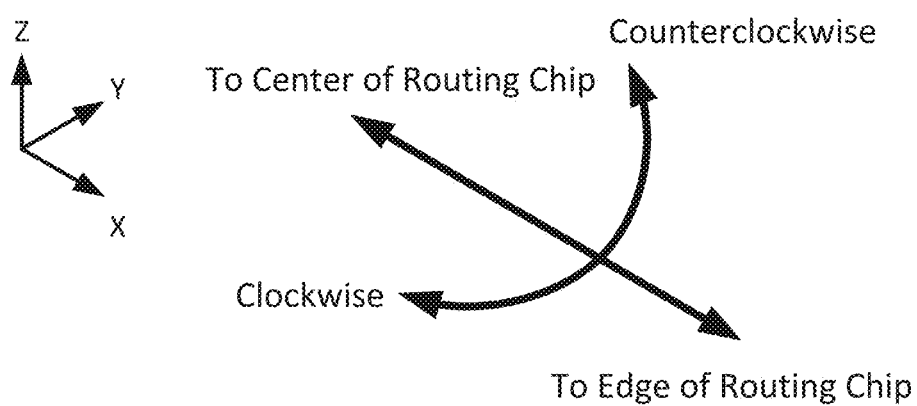
Figure 6B:
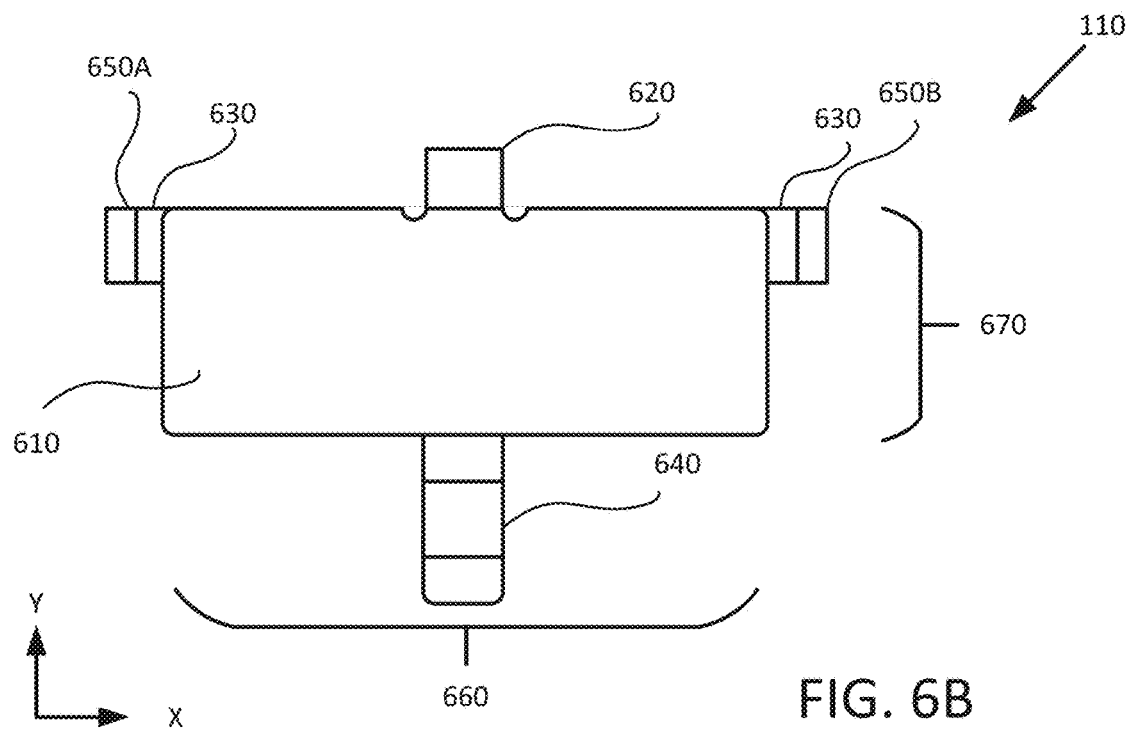
Figure 6C:
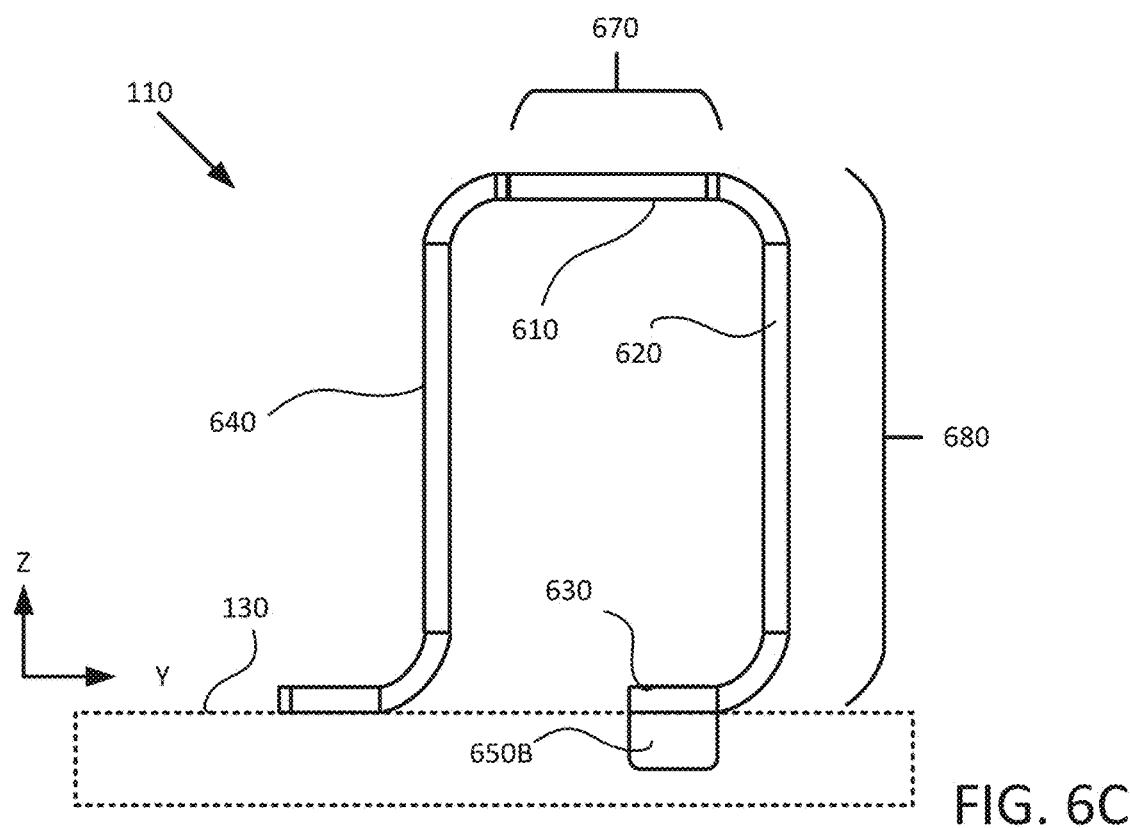

FIGS. 5A and 5B illustrate several views of a spacer 230 of a dual mode antenna 120 as in FIGS. 2A-2C, according to embodiments of the present disclosure. FIG. 5A provides an isometric view of the spacer 230, while FIG. 5B provides a cross-sectional view of the spacer 230 in the ZY plane taken along line 505. Although illustrated as a generally rectangular prism, the spacer 230 can be formed with other shapes in various embodiments.

The spacer 230 defines several cavities to engage and capture the first aerial 210 and the second aerial 220 and maintain vertical and horizontal offsets between the aerials 210, 220 when assembling the dual mode antenna 120 per FIGS. 2A-2C. A first cavity 510 is configured to engage the first horizontal member 310 of the first aerial 210, and a second cavity 520 is configured to engage the second horizontal member 410 of the second aerial 220. The first cavity 510 is open in a ZX plane to allow insertion of the first horizontal member 310 therein, and is open in one or more ZY planes to allow the inserted first horizontal member 310 to extend outward from the spacer 230 in the X direction.

In various embodiments, a first socket 530A and a second socket 530B are provided to engage a corresponding first tooth 340A and second tooth 340B per FIGS. 3A-3C. In various embodiments, more or fewer sockets can be provided in various patterns and cross-sectional shapes to engage a corresponding number, pattern, and cross-sectional shaping of teeth included on the first horizontal member 310. The sockets and corresponding teeth help to capture the first horizontal member 310 in the first cavity 510 and align the first aerial 210 with the second aerial 220 when assembled.

The second cavity 520 is open in a ZX plane to allow insertion of the second horizontal member 410 therein and is closed in the ZY planes to capture the second horizontal member 410 and align the second aerial 220 with the first aerial 210 when assembled.

A first distance 540 between how far the first cavity 510 extends into the spacer 230 in the Y direction and how far the second cavity 520 extends into the spacer 230 in the Y direction (in the opposite direction) defines and maintains a horizontal offset between the aerials 210, 220 when assembled into the dual mode antenna 120. A second distance 550 between a lower extent of the first cavity 510 in the spacer 230 in the Z direction and an upper extent the second cavity 520 in the spacer 230 in the Z direction defines and maintains a vertical offset between the aerials 210, 220 when assembled into the dual mode antenna 120.

The spacer 230 is made of a dielectric material through which the first aerial 210 and the second aerial 220 can electromagnetically couple when operating at the second frequency. In various embodiments, the spacer 230 is made of a dielectric material that is heat resistant to at least 250 degrees Celsius to withstand a solder reflow process. For example, the spacer 230 can be connected to both the first aerial 210 and the second aerial 220 to assemble the dual mode antenna 120 before the dual mode antenna 120 is connected to the routing substrate 130 via a soldering process. In some embodiments, the spacer 230 can be omitted (e.g., using air as a dielectric between the aerials 210, 220), or can be connected to the aerials 210, 220 after the aerials 210, 220 are soldered to the routing substrate 130.

FIGS. 6A-6C illustrate several views of a single mode antenna 110, according to embodiments of the present disclosure. FIG. 6A provides an isometric view of the single mode antenna 110, while FIG. 6B provides a facing view in the YX plane and FIG. 6C provides a facing view in the ZY plane.

The single mode antenna 110 includes a horizontal member 610, a first vertical member 620 (also referred to as a first leg) with a foot 630 that connects the single mode antenna 110 to the routing substrate 130 (illustrated in dashed lines in FIG. 6C), and a second vertical member 640 (also referred to as a second leg) that also connects the single mode antenna 110 to the routing substrate 130. The legs can be connected to the routing chip 130 via various divots or through-holes that one or more toes are inserted into and/or via a connection (e.g., a solder connection) between the surface of the routing chip 130 (or a solder pad defined thereon) and a foot of the respective leg. In various embodiments, the foot 630 can be longer than, shorter than, or the same length (in the X direction) as the horizontal member 610, and can optionally include one or more of a first toe 650A and a second toe 650B that are configured to slot into and engage a corresponding depression or through-hole in the routing substrate 130, which can include a contact pad or can provide for physical alignment of the single mode antenna 110 without including a contact pad therein. Although not illustrated, in some embodiments, the second vertical member 640 can also include a corresponding toe. In addition to or instead of one or more toes 650A, 650B, the foot 630 and/or the second vertical member 640 can be mounted (e.g., by a solder joint) to a contact pad defined on the surface of the routing substrate 130. For example, the foot 630 can be connected to a trace in the routing substrate 130 that is connected to ground and the second vertical member 640 can be connected to a trace in the routing substrate 130 that is connected to a signal output.

The horizontal member 610 has a length 660 (in the X direction) and a width 670 (in the Y direction), and the first vertical member 620 and the second vertical member 640 have a height 680 (in the Z direction). The length 660 and width 670 are set based on the first frequency to receive signals carried on the first frequency. Because the toes 650A, 650B (if included) are configured to sit below the surface of the routing substrate 130, the height of the toes 650A, 650B (in the Z direction) is not included in the height 680 of the vertical member 620, 640.

In various embodiments, the single mode antenna is 110 is formed from a single sheet of metal of substantially uniform thickness that is bent into a three-dimensional shape in which the horizontal member 610 is substantially perpendicular to the vertical members 620, 640. In various embodiments, the foot 630 may be longer or shorter than is illustrated, may bend inward from the first vertical member 620 to be underneath the horizontal member 610 (as illustrated) or outward from the first vertical member 620 to not be overlapped by the horizontal member 610.

Each of the single mode antennas 110 connected to the routing substrate 130 are oriented in the same direction. For example, in FIG. 6A, the second vertical member 640 is located clockwise to the first vertical member 620 when considering the routing substrate 130 in the XY plane to rotate about the Z axis, and is represented of each of the plurality of single mode antennas 110. In another example, each of the single mode antennas 110 could be oriented in the opposite alignment shown in FIG. 6A to have the first vertical member 620 located clockwise to the second vertical member 640. In various embodiments, the single mode antennas 110 are oriented with the seconder vertical member 640 located clockwise or counterclockwise to the first vertical member 620 based on whether the second aerials 220 of the dual mode antennas 220 (per FIGS. 2A-3C) are located clockwise or counterclockwise to the respective first aerials 210 so that the routing substrate 130 can define identical attachment points for the single mode antennas 110 and dual mode antennas 120.

Figure 7:
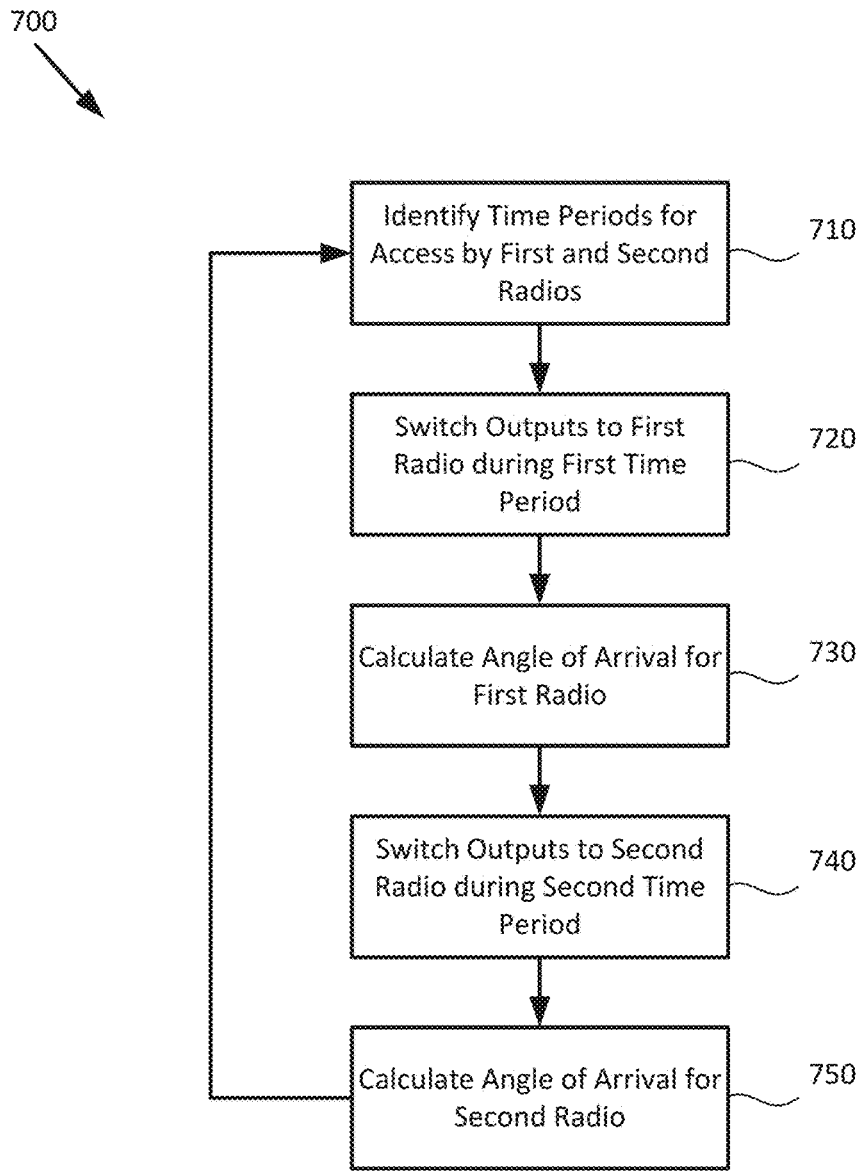
FIG. 7 is a flowchart of a method for operating an antenna array, according to embodiments of the present disclosure.

FIG. 7 is a flowchart of a method 700 for operating an antenna array, according to embodiments of the present disclosure. Method 700 begins with block 710, where a host controller 140 identifies the time periods that at least a first radio 150A and a second radio 150B are provided individual access to receive signals from an antenna array 100 with two sets of antennas configured to operate at different frequencies. The host controller 140 identifies a first time period that the first radio 150A is given access to the antenna array 100 and a second time period that the second radio 150B is given access to the antenna array 100. The first and second time periods are non-contemporaneous (i.e., the radios 150 are not given simultaneous access to the antenna array 100), and in some embodiments can include a guard period between the first and second time periods.

At block 720, the host controller 140 switches, during the first time period, outputs from the antenna array 100 to the first radio 150A (and away from the second radio 150B). When the first radio 150A is a WiFi signaling device that uses signals of the first frequency (e.g., 5 GHz), the host controller 140 connects the outputs from all of the single mode antennas 110 and dual mode antennas 120 of the antenna array 100 to the first radio 150A. The connected dual mode antennas 120 operate as monopole antennas, and the single mode antennas 110 operate as loop antennas when receiving signals from a STA using the first frequency. When the first radio 150A is a WiFi signaling device that uses signals of the second frequency (e.g., 2.4 GHz), the host controller 140 connects the outputs from all of the dual mode antennas 120 of the antenna array to the first radio 150A, and leaves the outputs from the single mode antennas 110 disconnected from the first radio 150A. The connected dual mode antennas 120 operate as loop antennas, and the single mode antennas 110 are inactive when receiving signals from a STA using the second frequency.

At block 730, the first radio 150A receives one or more signals from a STA using the activated antennas of the antenna array 100 and calculates the AoA of the signals from the STA relative to the antenna array 100 using relative differences in phase or time of receipt at different antennas of the antenna array 100. When the first radio 150A is a WiFi signaling device, one dual mode antenna 120 is designated as a reference antenna to which signals received at the other active antennas are compared in the AoA calculations.

At block 740, the host controller 140 switches, during the second time period, outputs from the antenna array 100 to the second radio 150B (and away from the first radio 150A). When the second radio 150B is a Bluetooth signaling device that uses signals of the second frequency (e.g., 2.4 GHz), the host controller 140 connects the outputs from all but one of the dual mode antennas 120 of the antenna array to the first radio 150A, and leaves the outputs from the single mode antennas 110 disconnected from the first radio 150A. The one dual mode antenna 120 left unconnected is reference dual mode antenna 120 (e.g., the dual mode antenna 120 that replaces a single mode antenna 110 in the alternating pattern or the pair of antennas that includes two dual mode antennas 120). The connected dual mode antennas 120 operate as loop antennas, and the single mode antennas 110 and reference dual mode antenna 120 are inactive when receiving signals from a STA using the second frequency.

At block 750, the second radio 150B receives one or more signals from a STA using the activated antennas of the antenna array 100 and calculates the AoA of the signals from the STA relative to the antenna array 100 using relative differences in phase or time of receipt at different antennas of the antenna array 100. Method 700 then returns to block 710, where the host controller 140 determines how and when to next switch the outputs of the antenna array 100 to the radios 150.

Figure 8:
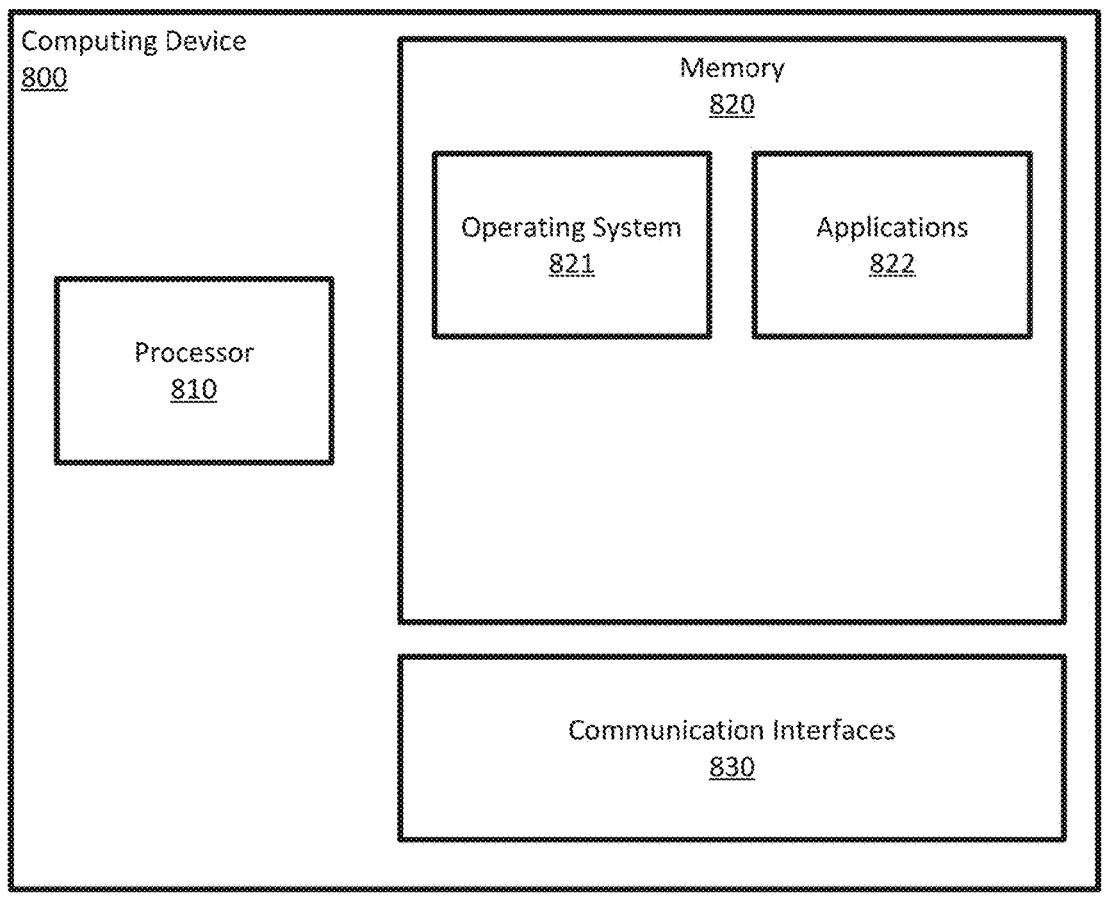
FIG. 8 illustrates hardware of a computing device, according to embodiments of the present disclosure.

FIG. 8 illustrates hardware of a computing device 800, as may be used in as a host controller 140 or other system to control access to an antenna array 100 and/or calculating AoA for various stations via different radios 150 sharing the antenna array 100. The computing device 800 includes a processor 810, a memory 820, and communication interfaces 830. The processor 810 may be any processing element capable of performing the functions described herein. The processor 810 represents a single processor, multiple processors, a processor with multiple cores, and combinations thereof. The communication interfaces 830 facilitate communications between the computing device 800 and other devices. The communications interfaces 830 are representative of wireless communications antennas and various wired communication ports. The memory 820 may be either volatile or non-volatile memory and may include RAM, flash, cache, disk drives, and other computer readable memory storage devices. Although shown as a single entity, the memory 820 may be divided into different memory storage elements such as RAM and one or more hard disk drives.

As shown, the memory 820 includes various instructions that are executable by the processor 810 to provide an operating system 821 to manage various functions of the computing device 800 and one or more applications 822 to provide various functionalities to users of the computing device 800, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An antenna array, comprising:
a routing substrate;
a plurality of dual mode antennas coupled to the routing substrate, each dual mode antenna included in the plurality of dual mode antennas operating in: (i) a first operational mode as a monopole antenna and (ii) a second operational mode as a loop antenna;
a reference dual mode antenna coupled to the routing substrate;
a plurality of single mode antennas coupled to the routing substrate; and
wherein each antenna of the plurality of dual mode antennas, the reference dual mode antenna, and the plurality of single mode antennas has substantially equal spacing relative to a first neighboring antenna and a second neighboring antenna.

2. The antenna array of claim 1, wherein each of the plurality of single mode antennas comprises:
a first vertical member of a predefined height connected to the routing substrate;
a second vertical member of the predefined height connected to the routing substrate; and
a first horizontal member perpendicular to and connected to the first vertical member and the second vertical member and extending in a plane parallel to the routing substrate at the predefined height.

3. The antenna array of claim 1, wherein the reference dual mode antenna and each of the plurality of dual mode antennas comprise:
a first aerial, comprising:

a first vertical member; and
a first horizontal member extending from the first vertical member in a first plane perpendicular to the first vertical member; and
a second aerial, comprising:
a second vertical member; and
a second horizontal member extending from the second vertical member in a second plane perpendicular to the second vertical member, wherein the second plane is separated from the first plane by a first distance.

4. The antenna array of claim 3, wherein the reference dual mode antenna and each dual mode antenna of the plurality of dual mode antennas further comprise:
a spacer in contact with the first horizontal member and the second horizontal member, configured to maintain the first distance between the first horizontal member and the second horizontal member and to maintain a horizontal offset between how far the first horizontal member extends in the first plane toward the second vertical member and how far the second horizontal member extends in the second plane toward the first vertical member.

5. The antenna array of claim 1, wherein space between neighboring antennas on the routing substrate is not greater than half of a wavelength for which the plurality of dual mode antennas, the reference dual mode antenna, and the plurality of single mode antennas are configured to receive.

6. An antenna array, comprising:
a routing substrate;
a plurality of dual mode antennas coupled to the routing substrate;
a reference dual mode antenna coupled to the routing substrate;
a plurality of single mode antennas coupled to the routing substrate;
wherein each antenna of the plurality of dual mode antennas, the reference dual mode antenna, and the plurality of single mode antennas is arranged evenly relative to a first neighboring antenna and a second neighboring antenna;
a first radio of a first frequency configured to use the plurality of dual mode antennas and the reference dual mode antenna in a first operational mode as monopole antennas and the plurality of single mode antennas as loop antennas to identify a first Angle of Arrival (AoA) for first signals of the first frequency; and
a second radio of a second frequency different from the first frequency configured to use the plurality of dual mode antennas in a second operational mode as loop antennas to identify a second AoA for second signals of the second frequency.

7. The antenna array of claim 6, wherein the first radio uses WiFi signaling at 5 GHz for the first frequency and the second radio uses one of WiFi signaling or Bluetooth signaling at 2.4 GHz for the second frequency, further comprising:
a host controller, configured to give one of the first radio and the second radio control of the antenna array at a given time.

8. A system, comprising:
a processor; and
a memory storage device including instructions that when executed by the processor perform an operation comprising:
identifying a first radio of a first RAT type to receive signals from an antenna array during a first time period and a second radio of a second RAT type that is different than the first RAT type to receive signals from the antenna array during a second time period that is non-contemporaneous with the first time period, wherein the antenna array includes a plurality of dual mode antennas and a plurality of single mode antennas;
switching, during the first time period, outputs from the antenna array to the first radio, wherein the plurality of dual mode antennas are operated as monopole antennas and the plurality of single mode antennas are operated as loop antennas;
calculating a first AoA for signals of the first RAT type received during the first time period;
switching, during the second time period, outputs from the antenna array to the second radio, wherein the plurality of dual mode antennas are operated as loop antennas; and
calculating a second AoA for signals of the second RAT type received during the second time period.

9. The system of claim 8, wherein the antenna array, comprises:
a routing substrate;
wherein the plurality of dual mode antennas include a plurality of operational dual mode antennas and a single reference dual mode antenna, wherein each dual mode antenna of the plurality of dual mode antennas includes a first aerial that operates as a monopole antenna connected a signal output and a second aerial that electromagnetically couples with the first aerial to operate as a loop antenna connected to ground;
wherein the plurality of single mode antennas are each connected to the routing substrate with a first leg connected to an output and a second leg connected to ground; and
wherein each antenna of the plurality of dual mode antennas and the plurality of single mode antennas is arranged evenly relative to a first neighboring antenna and a second neighboring antenna.

10. The system of claim 9, wherein the first aerial includes a first horizontal member extending in a first plane parallel to the routing substrate; and
wherein the second aerial includes a second horizontal member extending in a second plane parallel to the routing substrate, wherein the second plane is separated from the first plane by a first distance.

11. The system of claim 8, wherein the plurality of dual mode antennas and the plurality of single mode antennas are vertically polarized.

12. The system of claim 8, wherein the first radio is a WiFi radio and the second radio is a Bluetooth radio.

* * * * *